June 7, 1966  C. E. CLIFFORD ETAL  3,255,085
RADIATION SHIELD ARRANGEMENT FOR NUCLEAR REACTOR
Filed Jan. 31, 1961  3 Sheets-Sheet 1

Inventors
CHARLES E CLIFFORD
KNUD ANTONSEN
By Soans, Anderson,
Luedeka & Fitch  Attys June 7, 1966   C. E. CLIFFORD ETAL   3,255,085
RADIATION SHIELD ARRANGEMENT FOR NUCLEAR REACTOR
Filed Jan. 31, 1961   3 Sheets-Sheet 2

Inventors
CHARLES E CLIFFORD
KNUD ANTONSEN
By Soans, Anderson,
Luedeka + Fitch Attys

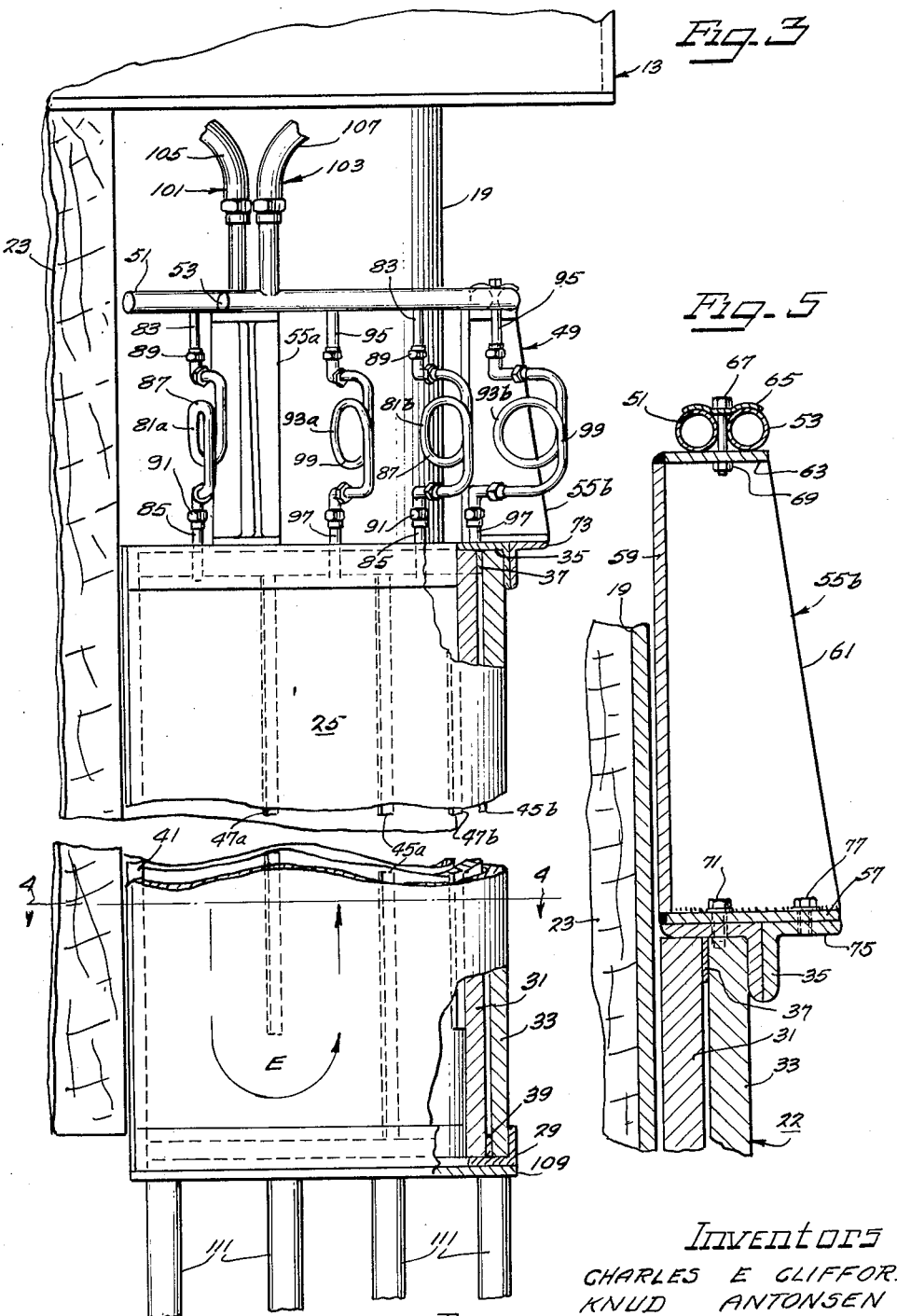

United States Patent Office 3,255,085
Patented June 7, 1966

3,255,085
RADIATION SHIELD ARRANGEMENT FOR NUCLEAR REACTOR
Charles E. Clifford, Del Mar, and Knud Antonsen, San Diego, Calif., assignors to General Dynamics Corporation, New York, N.Y., a corporation of Delaware
Filed Jan. 31, 1961, Ser. No. 86,088
4 Claims. (Cl. 176—33)

The present invention relates, generally, to nuclear reactor systems and more specifically it relates to a radiation shield which is adaptable for selectively changing the intensity and/or character of radiation in a preselected area in such a system.

Nuclear reactor systems include, generally, a reactive core in which fissionable material is present, a fluid coolant for the core and means for shielding the core. In certain nuclear reactors, the radiant energy emanating from the core may be utilized for providing radiation in a preselected area in order to observe, for example, the physico-chemical changes which nuclear radiation may induce in material disposed in that area.

In this connection, it is often desirable that the intensity and/or character of radiation in the area may be selectively changed. For example, in successive experiments, it may be desirable to first expose a given substance to both gamma rays and neutrons and thereafter to expose the same or a like substance primarily to neutrons.

It is a general object of the present invention to provide a radiation shield which is adaptable for selectively changing the intensity and/or character of radiation in a preselected area in a nuclear reactor system. A more particular object of the present invention is to provide a radiation shield in a nuclear reactor system which shield is movable. It is a further object to provide a radiation shield in a nuclear reactor system which shield is adapted for relatively rapid movement and is self-supporting.

Other objects and advantages will become apparent from the following description and accompanying drawings, in which:

FIGURE 3 is a fragmentary elevational view, partly broken away, of the radiation shield shown in FIGURE 1;

FIGURE 5 is an enlarged cross-sectional view taken generally along line 5—5 of FIGURE 2.

Figure 1:
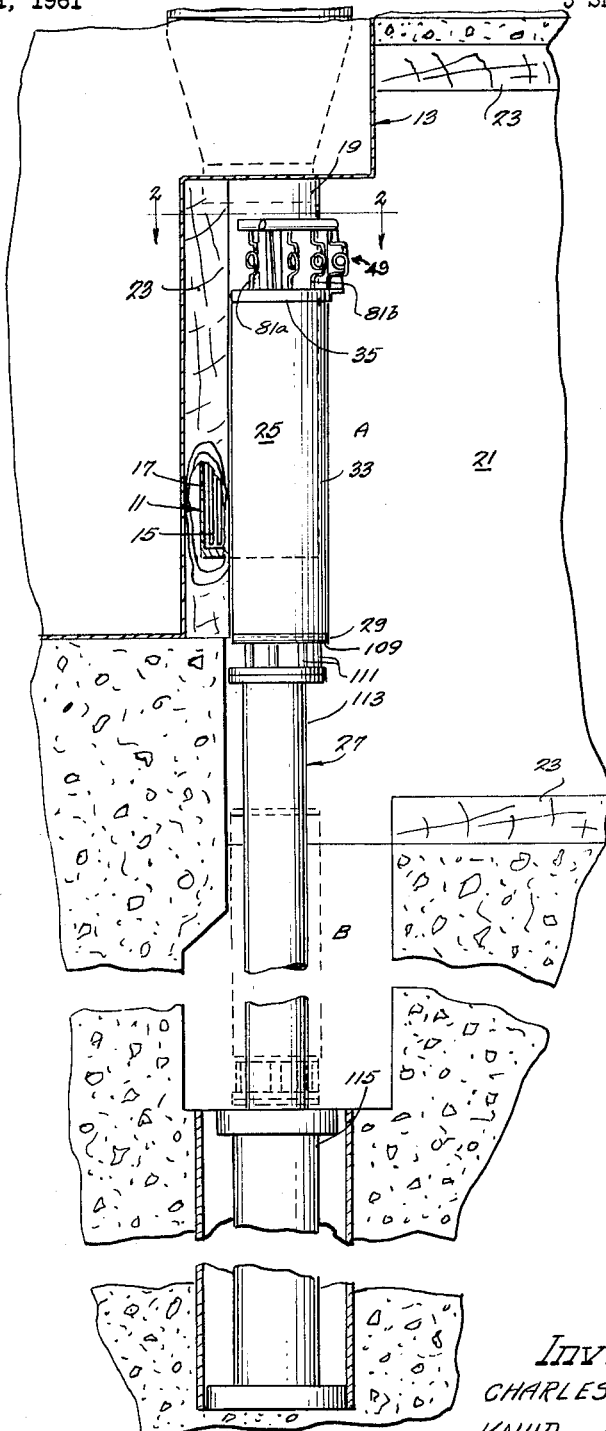
FIGURE 1 is a fragmentary cross-sectional view, in elevation, of a nuclear reactor system which incorporates a radiation shield in accordance with the present invention.

In general, a nuclear reactor system in accordance with the present invention includes a reactor tank and a reactive core supported within the tank. The tank is filled with a suitable fluid, such as water, which serves as a coolant for the core. An irradiation zone is provided in the reactor system, which zone is disposed outside the core and is exposed to fast neutron and gamma radiation from the core. Means are provided for selectively moving the shield into and out of the path of neutron and gamma radiation from the core to the radiation zone, whereby the intensity and/or character of the radiation in the irradiation zone may be changed.

Referring more particularly to the specific reactor system illustrated in the drawings, the system includes a reactive core 11 supported near the bottom of a reactor tank 13. The reactor tank is disposed in a correspondingly shaped pit in the ground so that effective shielding against radiation may be afforded without resorting to expensive above-ground shielding structures. The reactor tank is filled with a suitable fluid which acts as a reflector moderator, coolant and shield for the core. For these purposes either ordinary or heavy water is acceptable.

All of the various structural members disposed within the reactor tank and the reactor tank itself are preferably formed of non-corrodable materials having a low neutron capture cross section, such as aluminum or stainless steel.

The reactive core of the reactor system may be of any suitable construction. One suitable core is the one employed in the TRIGA reactor which is manufactured and sold by the assignee of this application. The core 11 of the illustrated reactor is in the general form of a right cylinder and includes a lattice of generally vertically extending fuel elements 15. The fuel elements are supported in position by a tubular shroud 17 which surrounds the same. The core 11 of the reactor is supported in spaced relation to the bottom of the tank 13 by a suitable support means (not shown) positioned above the reactor tank. The support means may be adapted to move the reactive core 11 horizontally within the reactor tank.

As shown in FIGURE 1, the core 11 is disposed in a convexly curved projection 19 in the reactor tank. In this projection 19 the core 11 is disposed so that fast neutron and gamma radiation therefrom enters an adjacent radiation zone or irradiation facility. The facility is in the form of a room 21, one wall of which is adjacent the reactor tank. The room 21 is shielded with shielding material which, in the illustrated structure, is concrete. The surfaces of the room are covered with wood lining 23 in order to minimize the effects of induced radiation in the concrete shielding.

The reactor system is provided with a radiation shield 25 which is movable to and from a position adjacent the room-facing surface of the projection 19. Specifically, as shown in FIGURE 1, the shield is supported on a motive means 27, described hereinafter, which selectively reciprocates the shield 25 vertically to an extended position A wherein the shield is in the path of radiation from the core 11 to the room 21, and a retracted position B (shown by dotted lines in FIGURE 1). The shield 25 is made of a material such that, in its extended position, the shield serves as a filter for core gamma rays and a reflector for core neutrons.

Figure 2:
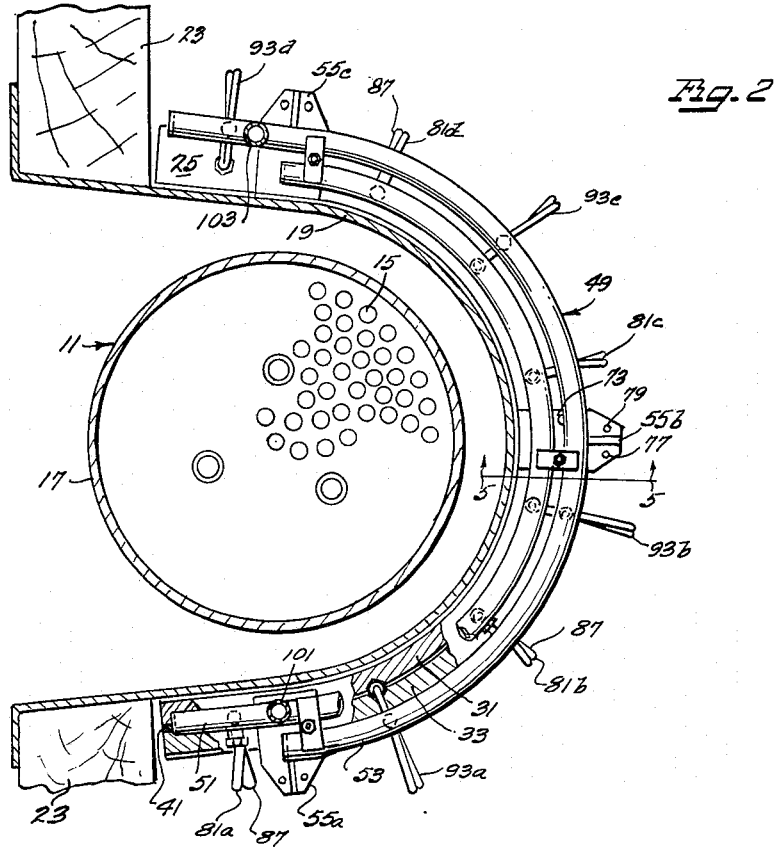
FIGURE 2 is an enlarged cross-sectional view, of a portion of the nuclear reactor system taken along line 2—2 of FIGURE 1, with portions of the radiation shield broken away to better illustrate its internal structure.
Figure 4:
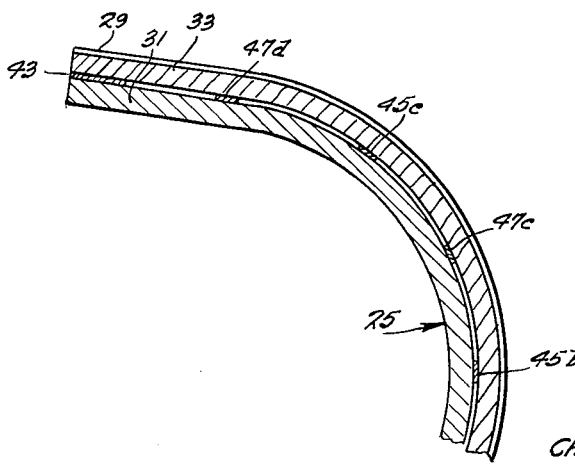
FIGURE 4 is a fragmentary cross-sectional view, showing only the radiation shield, taken generally alone line 4—4 of FIGURE 3.

As illustrated in FIGURES 2, 3, and 4, the radiation shield 25 is generally arcuate in horizontal cross section and includes a base 29 having an inner or first arcuate plate 31 and an outer or second arcuate plate 33, extending vertically therefrom in closely juxtaposed relation to each other. A top rim 35 is connected to the upper ends of the plates 31 and 33. In the illustrated embodiment the plates 31 and 33 are composed of a high-atomic number element. Because of its desirable shielding characteristics in respect to gamma rays, lead is the preferred material of construction.

As illustrated more clearly in FIGURES 2 and 4, the plates 31 and 33 each have an arcuate configuration which conforms to the arcuate wall of the projection 19 of the tank 13. The base 29 is made from a structural angle, which also has an arcuate configuration which conforms to the arcuate wall of the projection 19. The base 29 is disposed with a horizontally extending leg thereof abutting the lower end of the plates 31 and 33 and with the other leg thereof extending upwardly along the convex surface of the outer plate 33. The top rim 35 is made from a structural angle having an arcuate configuration which conforms to the arcuate wall of the projection 19. The top rim 35 is disposed with a horizontally extending leg thereof abutting the upper end of the plates 31 and 33, and with the other leg extending downwardly along the convex surface of the outer plate.

The plates 31 and 33 are maintained in closely juxtaposed relation by spacing means disposed between the plates adjacent the periphery of the plates 31 and 33. In the illustrated embodiment, the spacing means includes a top peripheral spacer 37, a bottom peripheral spacer 39, a first vertical peripheral spacer 41 and a second vertical peripheral spacer 43. The spacers 37, 39, 41, and 43 are formed from elongated strips of a suitable material, such as lead, having a thickness sufficient to maintain the plates 31 and 33 a predetermined distance apart. The spacers are each joined to the convex surface of the inner plate 31 and to the concave surface of the outer plate 33 in sealing relation thereto by a suitable means such as by a lead burning process. The spacers abut each other so as to lie in a closed configuration, and thereby define a fluid-tight enclosure between the plates 31 and 33 and the peripheral spacers 37, 39, 41, and 43.

In the illustrated embodiment, the spacing means also includes a series of vertically extending spaced-apart interior spacers 45a, 45b, and 45c between the plates. As illustrated in FIGURE 3, the interior spacers 45a, 45b, and 45c extend from the top peripheral spacer 37 to the bottom peripheral spacer 39. The interior spacers 45a, 45b, and 45c serve to provide compartments in the enclosure between the inner and outer plates 31 and 33, of which a representative compartment is denoted by the letter E in FIGURE 3. Four such compartments are provided in the illustrated structure.

A passageway is formed in each compartment by providing narrow baffles 47a, 47b, 47c, and 47d, between the inner and outer plates 31 and 33 within each compartment, which baffles extend vertically from the top reripheral spacer 37 to a point somewhat above the bottom peripheral spacer 39.

The radiation shield 25 is cooled by circulating a coolant, such as water, through the passageways. The passageways are connected in parallel by a coolant manifold assembly 49, disposed at the top of the shield. The coolant manifold assembly 49 includes an inlet header 51, and an outlet header 53 which are formed of arcuate lengths of tubing, the tubing being closed at both ends.

The headers 51 and 53 are supported above the shield by a plurality of spaced apart header support brackets 55a, 55b, and 55c. As particularly illustrated in FIGURE 5, a representative header support bracket 55b includes a horizontally extending base plate 57, an upright back plate 59, an upright gusset plate 61, and a horizontally extending top plate 63. The upright back plate 59 and the upright gusset plate 61 are disposed perpendicular to each other and also perpendicular to the base plate 57. The top plate 63 is disposed atop the upright back plate 59 and the upright gusset plate 61 to provide a horizontal supporting surface for the headers 51 and 53. All of the foregoing elements of the header support bracket are suitably joined to each other as by welding.

The inlet and outlet headers 51 and 53, respectively, are disposed on the top plates 63 of the brackets and are attached thereto by means of a clamp 65, a bolt 67, and a nut 69. The top plate 63 is provided with an opening which receives the bolt 67 therethrough.

As further exemplified in FIGURES 2 and 5, the header support bracket 55b is disposed on the top rim 35 of the radiation shield assembly 25, and is attached by stud bolts 71 and 73 extending through the base plate 57. In addition, an angular brace 75 is provided to furnish additional support for the header support bracket 55b. The brace 75 is suitably connected to the top rim 35, and receives stud bolts 77 and 79 which extend through the base plate 57.

As illustrated in FIGURES 2 and 3, a plurality of inlet connectors 81a, 81b, 81c and 81d are provided which extend between the inlet header 51 and one side of each compartment, thereby providing means for fluid communication therebetween. As exemplified by inlet connector 81a, each inlet connector includes an inlet header nipple 83 which is welded to the inlet header 51, and an inlet shield nipple 85, which extends through the top rim 35 and the top peripheral spacer 37 and which is attached in sealing relation therein. The inlet header nipple 83 and the inlet shield nipple 85 are in communication through a looped tube 87, which is attached thereto by appropriate tubing fittings 89 and 91, respectively.

A plurality of outlet connectors 93a, 93b, 93c, and 93d are also provided, as illustrated in FIGURES 2 and 3, which extend between the outlet header 53 and the other side of each compartment, thereby providing means for fluid communication therebetween. As exemplified by outlet connector 93a, each outlet connector is constructed substantially the same as inlet connector 81a, and includes an outlet header nipple 95, an outlet shield nipple 97, and a looped tube 99, extending therebetween.

The coolant manifold assembly 49 also includes a coolant supply line 101 and a coolant discharge line 103 connected respectively to the inlet header 51 and the discharge header 53. The supply line and the discharge lines each include a flexible conduit 105 and 107, respectively, which are connected to each header by a nipple. The flexible conduits 105 and 107 are suitably connected to a suitable source of coolant (not shown) mounted externally of the tank, which source may include coolant pumping means, a demineralizer, and a heat exchange means (not shown).

Since the entire radiation shield 25 is subjected to intense nuclear radiation, it is desirable that none of its components be adversely affected thereby, and it is also desirable that none of its components be of such a nature that they themselves become excessively radio-active. Accordingly, except for the inner and outer plates 31 and 33 and their associated spacers and baffles, all of the elements of the described embodiment of the radiation shield 25 are constructed of aluminum, which has the foregoing desirable characteristics. It will be understood that other materials having the same desirable characteristics may also be used, such as stainless steel.

Referring now to a more particular description of the motive means 27, it will be seen in FIGURE 1 that the radiation shield 25 is disposed on a platform 109 supported by a plurality of spaced legs 111 extending from the motive means 27 which in the illustrated embodiment is a conventional hydraulic piston 113 and cylinder 115. The piston 113 is reciprocated vertically by hydraulic pressure exerted within the cylinder 115. The cylinder is suitably supported within a pit in the floor of the room 21, and the hydraulic pressure within the cylinder is remotely regulated by appropriate pumping means (not illustrated) in another location in the nuclear reactor system.

In operation, the radiation shield 25 may be supported by the hydraulic lift assembly 27 at position A, as illustrated in FIGURE 1. The reactive core 11 is disposed relatively close to the arcuate projection 19 of the tank 13, and accordingly, a substantial portion of the radiation passes through the arcuate projection 19 and is available to the irradiation room 21. However, with the radiation shield at position A, the character of the radiation is changed upon passage therethrough.

In this connection, it has been pointed out hereinbefore that the inner and outer plates 31 and 33 are construced of high-atomic-number element, such as lead. Such a shield serves as a filter for gamma rays from the core and a reflector for core neutrons. Hence by reciprocating the radiation shield 25 the ratio of neutrons to gamma rays may be varied in the room 21. If the shield is made thick enough substantially all of the gamma rays may be absorbed by the shield.

The thermal energy which is liberated in the radiation shield 25 by the absorption of radiation therein is efficiently dissipated therefrom by the circulation of water through the passageways. As illustrated in FIGURE 3, cooling water is conducted from pumping means (not illustrated) through the coolant supply line 101 into the inlet header 51. The cooling water thence is conducted through the inlet connectors 81a, 81b, 81c, and 81d into each compartment. As exemplified by compartment E in FIGURE 3, the cooling water flows downwardly through compartment E, around the baffle 47a in the direction indicated by the arrows, and thence upwardly on the opposite side of the baffle 47a, thereby cooling the inner and outer plates 31 and 33. The cooling water is conducted outwardly through the outlet connector 93a, the outlet header 53, and thence through the coolant discharge line 103 to heat transfer means (not illustrated).

To continue the description of the operation of the present invention, it may be desired to expose samples to a greater ratio of neutrons to gamma rays than is obtainable in the irradiation room 21 when the radiation shield 25 is supported at position A. In accordance with the present invention, the radiation shield 25 may be retracted to position B, thereby eliminating the modifying effects thereof. In this connection, the radiation shield 25 is retracted by appropriately releasing the hydraulic pressure within the hydraulic cylinder 115, thereby allowing the hydraulic piston 113 to move downwardly for a distance at least equal to the height of the radiation shield 25.

It should be pointed out that the radiation shield 25 may be retracted to position B and repositioned at position A without requiring operating personnel to enter the irradiation room 21. Accordingly, the core 11 may continue to operate at its normal power level while the level and/or character of radiation in the irradiation room is changed, which is an important feature of the present invention.

Another important feature of the present invention is the provision of flexible coolant supply and discharge conduits 105 and 107, respectively. The coolant supply and discharge conduits are of sufficient length and flexibility to enable the radiation shield 25 to be moved between positions A and B without necessitating their disconnection from fixed pumping and heat transfer means, thereby providing improved operating efficiency.

Another feature of the present invention is the laterally self-supporting nature of the radiation shield 25. In this connection, the arcuate horizontal cross-section of the radiation shield 25 is such that a relatively large moment of inertia exists with respect to its axis of symmetry. Accordingly, the radiation shield 25 is inherently stable, and no lateral supports or braces are required to maintain the shield in an upright position upon the platform 109. In this connection, the radiation shield 25 may be bodily removed from the platform 109 by a lift truck or other appropriate means without dismantling or disconnecting any components, thereby enabling another shield to be substituted therefor quickly and effectively.

As discussed hereinbefore, the inner and outer plates 31 and 33 are preferably constructed of lead. Lead has a very low structural strength and also has a pronounced tendency to "creep," or undergo inelastic deformation. However, the particular design of the radiation shield 25 of the present invention enables the inner and outer plates 31 and 33 to bear the entire load of the shield without requiring structural reinforcement, and at the same time minimizes creep. In this connection, lead displays considerably less creep under compressive stress than under tensile stress. Accordingly, the height of the radiation shield 25 is chosen so that the inner and outer plates 31 and 33 are maintained primarily under compressive stress. This is an important feature of the present invention.

Thus, there has been provided a radiation shield which is adaptable for selectively changing the intensity and/or character of radiation in a nuclear reactor system. The shield is of a size which enables shielding of a relatively large area, and is self-supporting in nature. The shield is readily movable by conventional means, and is quickly and easily replaceable.

Various modifications and variations of apparatus in accordance with the present invention will be apparent from the foregoing description and drawings. As such, they are deemed to be within the scope of the present invention.

Various of the features of the present invention are set forth in the following claims.

What is claimed is:

1. A nuclear reactor system comprising a tank, a fluid coolant within said tank, a radiation zone adjacent said tank, said tank having a projection defining a wall in said zone, a reactive core supported within said projection whereby a portion of the core emits radiation into said zone, a laterally self-supporting radiation shield for shielding said projection, and motive means disposed beneath and carrying said shield for selectively moving said shield vertically into and out of the path of radiation from said core to said radiation zone, whereby the intensity and/or character of radiation in the radiation zone may be changed, said shield being freely standing upon said motive means and having no supporting attachment to other elements of the reactor system.

2. A nuclear reactor system comprising a tank, a fluid coolant within said tank, a reactive core supported within said tank, a radiation zone adjacent said tank which zone is exposed to fast neutron and gamma radiation from the core, a laterally self-supporting arcuate radiation shield for shielding said tank between said core and said radiation zone, said shield encircling at least about half of the periphery of said core, and motive means disposed beneath and carrying said shield for selectively moving said shield into and out of the path of radiation from said core to said radiation zone, said shield being freely-standing upon said motive means and unattached thereto and having no supporting attachment to other elements of the reactor system, said shield being composed of a high-atomic number element and being of sufficient thickness to attenuate the gamma radiation from the core whereby the ratio of neutron to gamma radiation in the radiation zone may be changed.

3. A nuclear reactor system comprising a reactor tank, a fluid coolant within said tank, a reactive core disposed in said tank, a radiation zone disposed adjacent said tank, a laterally self-supporting radiation shield positionable between said core and said radiation zone, said shield including an arcuate base, a first and a second arcuate plate of shielding material disposed on said base and extending generally vertically therefrom in juxtaposed relationship, means disposed between said first plate and said second plate for defining a passageway between said first and second plates, means in communication with the passageway for circulating coolant through said passageway, ad motive means disposed beneath and carrying said shield for selectively moving said radiation shield vertically into and out of its position between said core and said radiation zone, the arc described by said base and said first and second plates being sufficient to stabilize said shield upon said motive means in a freely-standing position.

4. A nuclear reactor system comprising a reactor tank, a fluid coolant within said tank, a reactive core disposed in said tank, a radiation zone disposed adjacent said tank, including a laterally self-supporting radiation shield positionable between said zone and said core, said shield including an arcuate base, a first and a second arcuate lead plate disposed on said base and extending generally vertically therefrom in juxtaposed relationship, spacer means disposed between said first and said second lead plates, said spacer means defining a passageway between said first and second lead plates, flexible conduit means in communication with the passageway for circulating coolant through said passageway, and motive means disposed below and carrying said shield for selectively reciprocating said radiation shield vertically into and out of the path of radiation from said core to said radiation zone, the arc described by said base and said first and second plates being sufficient to stabilize said shield upon said motive means in a freely-standing position with no supporting attachment to other elements of the reactor system.

References Cited by the Examiner

UNITED STATES PATENTS

| | | | |
|---|---|---|---|
| 3,003,941 | 10/1961 | Drolshagen et al. | 204—193.2-.2 |
| 3,016,463 | 1/1962 | Needham | 204—293.2-.36 |
| 3,031,394 | 4/1962 | McCorkle et al. | 204—193.2 |

LEON D. ROSDOL, *Primary Examiner.*

REUBEN EPSTEIN, CARL D. QUARFORTH,
*Examiners.*

M. R. DINNIN, R. C. LYNE, *Assistant Examiners.*